United States Patent [19]

Kotera

[11] Patent Number: 5,221,972
[45] Date of Patent: Jun. 22, 1993

[54] MEMORY-EQUIPPED FACSIMILE MACHINE

[75] Inventor: Hiroshi Kotera, Nagoya, Japan

[73] Assignee: Brother Kogyo Kabushiki Kaisha, Nagoya, Japan

[21] Appl. No.: 865,655

[22] Filed: Apr. 7, 1992

Related U.S. Application Data

[63] Continuation of Ser. No. 559,048, Jul. 30, 1990.

[30] Foreign Application Priority Data

Jul. 29, 1989 [JP] Japan .................. 1-89587[U]

[51] Int. Cl.⁵ .................. H04N 1/32; H04N 1/00
[52] U.S. Cl. .................. 358/468; 358/400; 358/434
[58] Field of Search .......... 358/400, 402, 403, 407, 358/412, 413, 434, 435, 436, 437, 438, 439, 440, 444, 468, 486

[56] References Cited

U.S. PATENT DOCUMENTS

4,712,139 12/1987 Kato .................. 358/468
5,050,006 9/1991 Ogawa .................. 358/402

*Primary Examiner*—Edward L. Coles, Sr.
*Assistant Examiner*—Thomas D. Lee
*Attorney, Agent, or Firm*—Oliff & Berridge

[57] ABSTRACT

A memory-equipped facsimile machine wherein image data read by a scanner device is once stored in a memory and is then retrieved therefrom for transmission to another facsimile via a telephone line. In order to disperse working load imposed to a microcomputer and to increase a transmission speed, the reading of the image on a document is performed during call estabishing and message procedure phases as opposed to reading during a beginning-of-message procedure phase. The microcomputer instructs the scanner device to read the document in the call estabishing procedure phase and then to stop reading the document in the beginning-of-message procedure phase. The microcomputer further instructs the scanner device to resume reading the document in the message procedure phase C.

2 Claims, 4 Drawing Sheets

MEMORY-EQUIPPED FACSIMILE MACHINE

This is a continuation of application Ser. No. 07/559,048 filed Jul. 30, 1990.

BACKGROUND OF THE INVENTION

The present invention relates to a memory-equipped facsimile machine wherein text data read by a scanner device is once stored in a memory and is then retrieved therefrom for transmission to another facsimile via a telephone line.

As is well known in the art, when a document is to be faxed, the document is scanned by a scanner device of the sending facsimile wherein a material contained on the document is translated into an electrical signal on a pixel basis. The receiving facsimile receives the electrical signal and reproduces the original document.

Various kinds of facsimile machines have different transmission systems and transmission speeds, and besides a facsimile machine has a multiplicity of communication capabilities in terms of modulation system, transmission speed, line density, etc. Therefore, it is necessary that those communication capabilities of both the sending and receiving facsimiles be recognized by each other and that a relevant communication system be established prior to faxing. To this end, a predetermined transmission sequence is essential when facsimile communication is performed. Such transmission sequence includes phase A for call establishing procedure, phase B for beginning-of-message procedure, phase C for message procedure, phase D for end-of-message procedure, and phase E for calling retrieval procedure. Each phase is divided into a multiplicity of blocks each containing signals for a common project.

FIG. 6 is an example of a standard transmission sequence pursuant to CCITT recommendation. In FIG. 6, CED is a called station identification signal representing that the called station is of non-voice terminal. DIS is a digital identification signal representing that the called station has a standard CCITT receiving capability. DCS is a digital command signal representative of a digital set command responsive to a standard function identified by the DIS signal. TCF is a training check signal which checks whether or not the channel is available for a given transmission speed upon confirming the training of a modem. CFR is a confirmation-to-receive signal sent from the sending facsimile to the receiving facsimile confirming that the facsimile machine is ready for reception. MESSAGE is an image signal picked up from a document to be transmitted. EOP is an end-of-procedure signal indicating that the pages of the documents are ended and that no further pages follow. MCF is a message confirmation signal produced from the receiving facsimile indicating that the message reception has been completed. DCN is a disconnect signal which indicates the start of phase E.

In conventional facsimile machines, scanning of the document and production of the image signal generally start with phase A. However, due to a great deal of processing for producing the image signal and transmitting the same, transmission takes a long time and thus the cost of a communication is increased. One proposed solution for this problem is adoption of an advanced reading wherein reading of the document is the started immediately after the settlement of the communication mode in phase B. However, even in the advanced reading, a high speed transmission cannot be accomplished because a large number of signals are to be detected in phase B and a great deal of processing is outstanding for a central processing unit equipped with the facsimile machine.

SUMMARY OF THE INVENTION

The present invention has been made to solve the above-mentioned problem, and it is an object of the invention to provide a facsimile machine with a high speed transmission capability.

Briefly and in accordance with the present invention, the reading operation by a scanner device is performed during phases A and C rather than during phase B, so that a working load imposed to a microcomputer in phase B is reduced and the working load is, as a whole, dispersed.

In the present invention, as shown in FIG. 1, there is provided a facsimile machine which comprises reading means R for reading an image on a document and outputting image data, storage means M for storing the image data, the image data stored therein being retrieved therefrom and modulated for transmission to another facsimile machine via a communication line, advanced reading means A for issuing an instruction to the reading means R to start reading the image on the document and to store the image data in the storage means M during a period of time from booting of the facsimile machine until establishment of communication to the another facsimile machine, reading stopping means B for issuing an instruction to the reading means R to stop reading the image on the document during a period of time from the establishment of communication to the another facsimile machine until a time when the image data stored in the storage means M can be transmitted to the another facsimile machine, and reading resuming means C for issuing an instruction to the reading means R to resume reading the image on the document when the image data stored in the storage means M can be transmitted to the another facsimile machine.

In the facsimile machine thus arranged, the image on the document is read by the reading means R during two different phases. Therefore, the working load imposed to a microcomputer is dispersed and a high speed facsimile transmission can be accomplished.

According to another aspect of the invention, there is provided a method of reading an image on a document with a scanner device incorporated in a facsimile machine wherein transmission of image data produced from the scanner device is transmitted pursuant to a predetermined transmission sequence comprising phases A, B, C, D and E, the method comprising the steps of checking whether a start switch provided in the facsimile machine is depressed for transmission of the image data to another facsimile machine, performing reading operation of the image on the document if the start switch is depressed, checking whether phase B is detected, stopping the reading operation if phase B is detected, checking whether phase C is detected, resuming the reading operation if phase C is detected, checking whether phase D is detected, and stopping the reading operation if phase D is detected.

The above and other objects, features and advantages of the present invention will become more apparent from the following description when taken in conjunction with the accompanying drawings in which a preferred embodiment of the present invention is shown by way of illustrative example.

data, and those filter outputs $b_l$—$b_m$ each may be weighted according to respective inputs and be summed up. In the case that respective divided data are equal in the number of bits, all data can be processed by the filter circuit units having the same constitution.

BRIEF DESCRIPTION OF THE DRAWINGS

In the accompanying drawings:

FIG. 7 is a block diagram showing a filter circuit according to a third embodiment of the invention;

FIG. 8 is a block diagram showing a filter circuit according to a fourth embodiment of the invention;

FIG. 9 is a block diagram showing a filter circuit according to a fifth embodiment of the invention;

FIG. 10 is a block diagram showing a filter circuit according to a sixth embodiment of the invention;

FIG. 11 is a block diagram showing a filter circuit according to a seventh embodiment of the invention;

FIG. 12 is a circuit diagram showing an example of an input bit selection circuit used in the filter circuit in FIG. 11;

FIG. 13 is a block diagram showing an improved filter circuit for ghost canceler in the prior art;

FIG. 14 is a block diagram showing an equivalent circuit of the circuit in FIG. 13;

FIG. 15 is a block diagram explaining the principle of eighth and ninth embodiments of the invention;

FIG. 16 is a block diagram showing a filter circuit according to an eighth embodiment of the invention;

FIG. 17 is a circuit diagram showing an example of a selection circuit and a coefficient register used in the filter circuit in FIG. 16;

FIG. 18 is a timing chart showing waveforms of signals in the circuits of FIG. 16 and FIG. 17; and FIG. 19 is a block diagram showing a filter circuit according to a ninth embodiment of the invention.

DETAILED DESCRIPTION OF EMBODIMENTS

Figure 1:
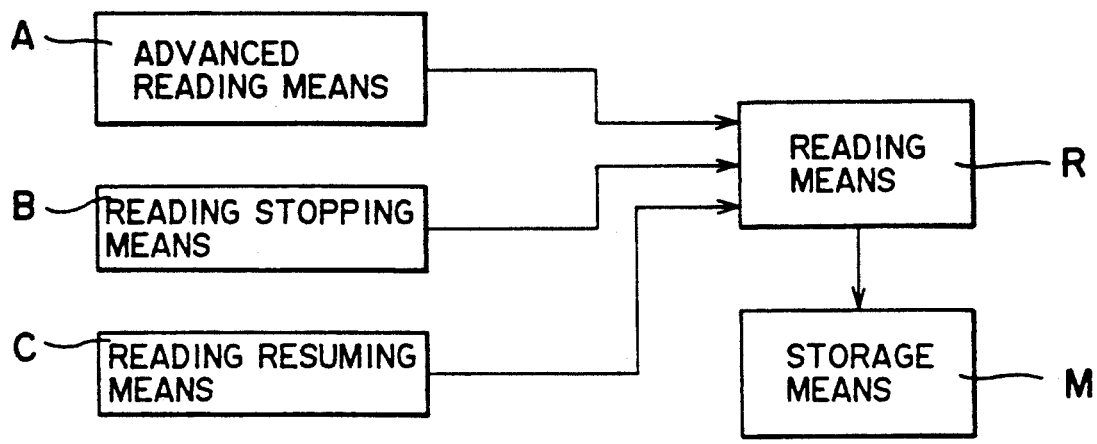
FIG. 1 is a block diagram showing a filter circuit according to a first embodiment of the invention.

FIG. 1 shows a first embodiment of the invention. The filter circuit in FIG. 1 comprises m filter circuit units 611, 612, ..., 61m, and an adder with weighting function 42 which weights outputs $b_1, b_2, ..., b_m$ of the filter circuit units 611, 612, ..., 61m by a factor corresponding to respective places of binary digits and then sums up the weighted outputs. Each filter circuit unit 611, 612, ... or 61m is constituted by a shift register 12 and an arithmetic unit 51 which mainly performs multiplication and addition. The shift register 12 and the arithmetic unit 51 operate at fs and nfs respectively, where fs is a sampling frequency of a digital signal being inputted, and n is an integer with n≧1. To the shift register 12 of each filter circuit unit are inputted data $a_1, a_2, ..., a_m$ which have been produced by dividing a plurality of bits constituting the input digital signal a into a plurality of bit groups respectively.

The data $a_1, a_2, ..., a_m$ produced by dividing a plurality of bits constituting the input digital signal a into a plurality of bit groups are inputted to the shift register 12 of separate filter circuit units respectively. At the arithmetic unit 51 of each filter circuit unit, an operation of multiplying each corresponding tap gain to a plurality of output signals having different delay times of each stage of the shift register 12 and summing up the multiplication results is carried out n times (n≧1) in every one sampling interval ts (=1/fs). Every time the multiplication results are summed up for one sampling interval ts (=1/fs), the sum result is outputted from each filter circuit unit 61. Outputs of each arithmetic unit 51 are outputted as outputs $b_1, b_2, ..., b_m$ of respective filter circuit units 611, 612, ..., 61m, and are weighted according to the weight of each of input data $a_1, a_2, ..., a_m$ (a place of binary bit in the original signal a) of each filter circuit unit 61 and are summed up by the adder with weighting function 42, and the sum result is outputted as a filter circuit output in every sampling interval ts.

Next, a plurality of embodiments will be explained where the present invention is applied to a filter for ghost canceling of television signals. A filter for ghost canceling has quite many taps generally, and therefore demand of reduction of the circuit scale is very strong.

A television receiver receives direct waves from sending antennas of broadcasting stations and electromagnetic waves reflected by any object simultaneously. Therefore, interference called a ghost sometimes occurs in the received picture.

Figure 3:
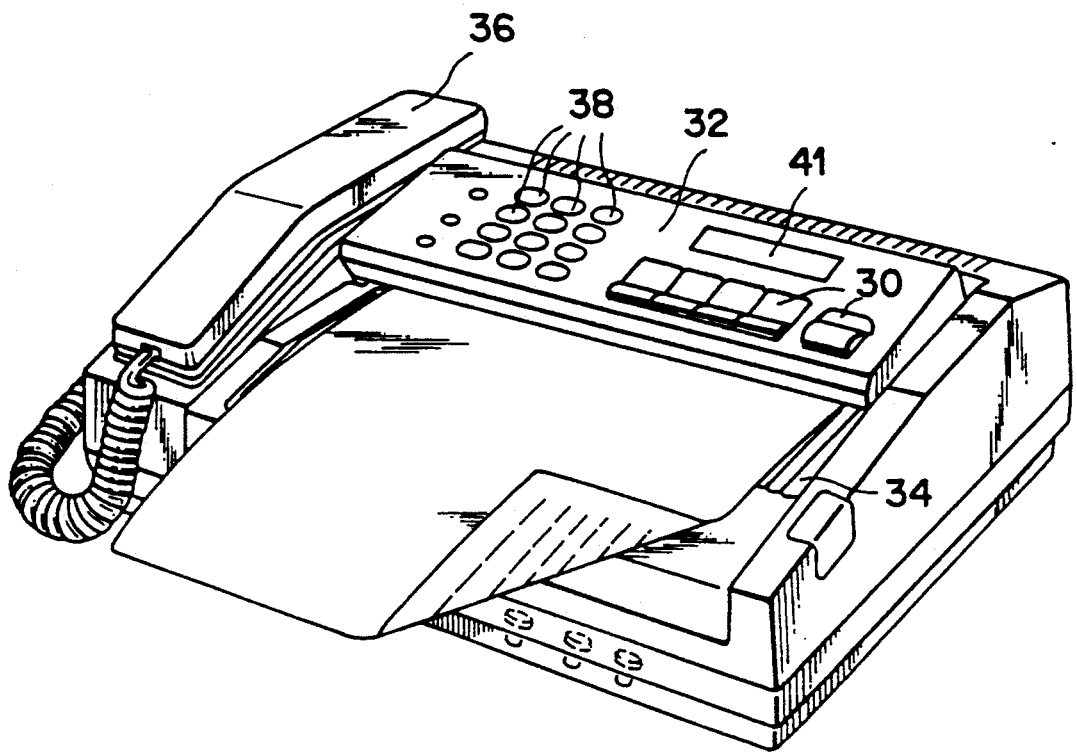
FIG. 3 is a block diagram showing a ghost canceler in a television receiver.
Figure 4:
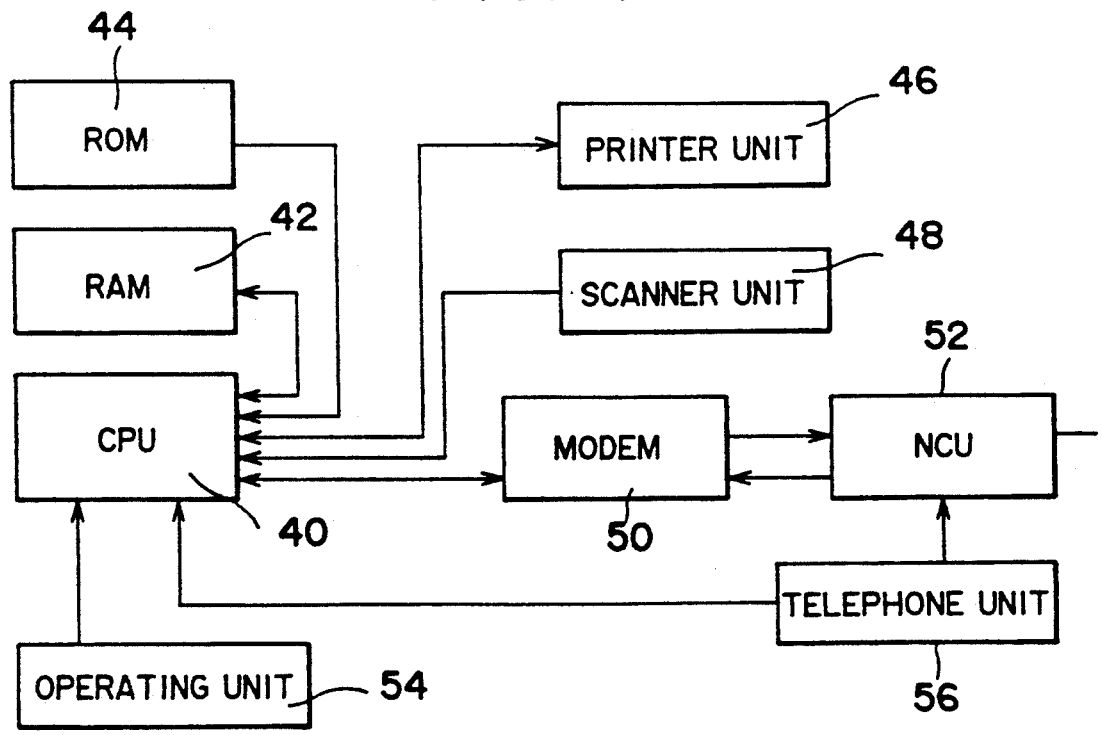
FIG. 4 is a block diagram showing a ghost canceler.

Conventionally, various kinds of ghost cancelers have been developed to cancel ghost as above described. FIG. 3 shows one example. Television signals are received by a receiving antenna 1, and signals of an optional channel are selected from the received television signals by a tuner 2 and demodulated by a demodulation circuit 3 and then ghost components are canceled by a ghost canceler 4. The ghost canceler 4 is constituted as shown in FIG. 4, and ghost canceling signals obtained by applying filtering to the input digital video signals in a filter for ghost canceling 5 are added to the original input digital video signals thereby ghost canceling is performed. Tap gain and tap position of the filter for ghost canceling 5 are controlled by a tap gain and tap position controller 6.

Figure 2:
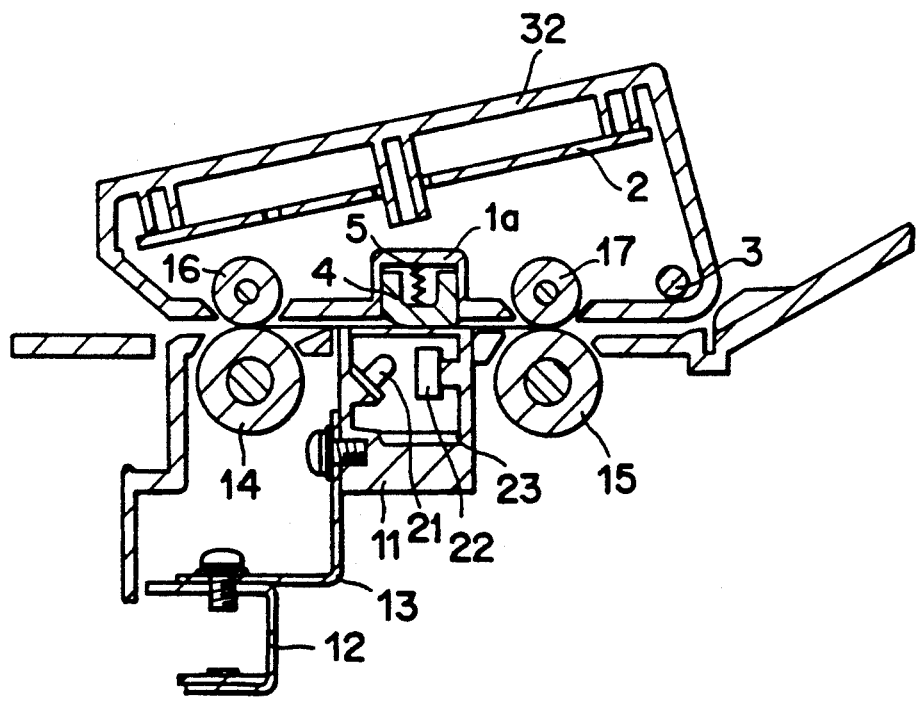
FIG. 2 is a block diagram of a transversal filter in the prior art.

As television signals received by the receiving antenna are a linear addition of direct waves and reflected waves, the transversal filter as shown in FIG. 2 may be used as a filter for ghost canceling. Accordingly, the filter circuit of the present invention can also be applied to the filter for ghost canceling.

It is necessary to constitute a transversal filter having several hundred taps in order to take measure against general ghost. But, in the filter for ghost canceling since almost all the tap gains for the output signals of each stage of the shift register are equal to zero practically, an operation need not be carried out for the output signals of all stages.

An embodiment of the present invention will now be described where a filter for ghost canceling having a maximum delay time of ghost being equal to 512 times of the sampling interval ts of the digital video signal and 128 taps has been manufactured.

Figure 5:
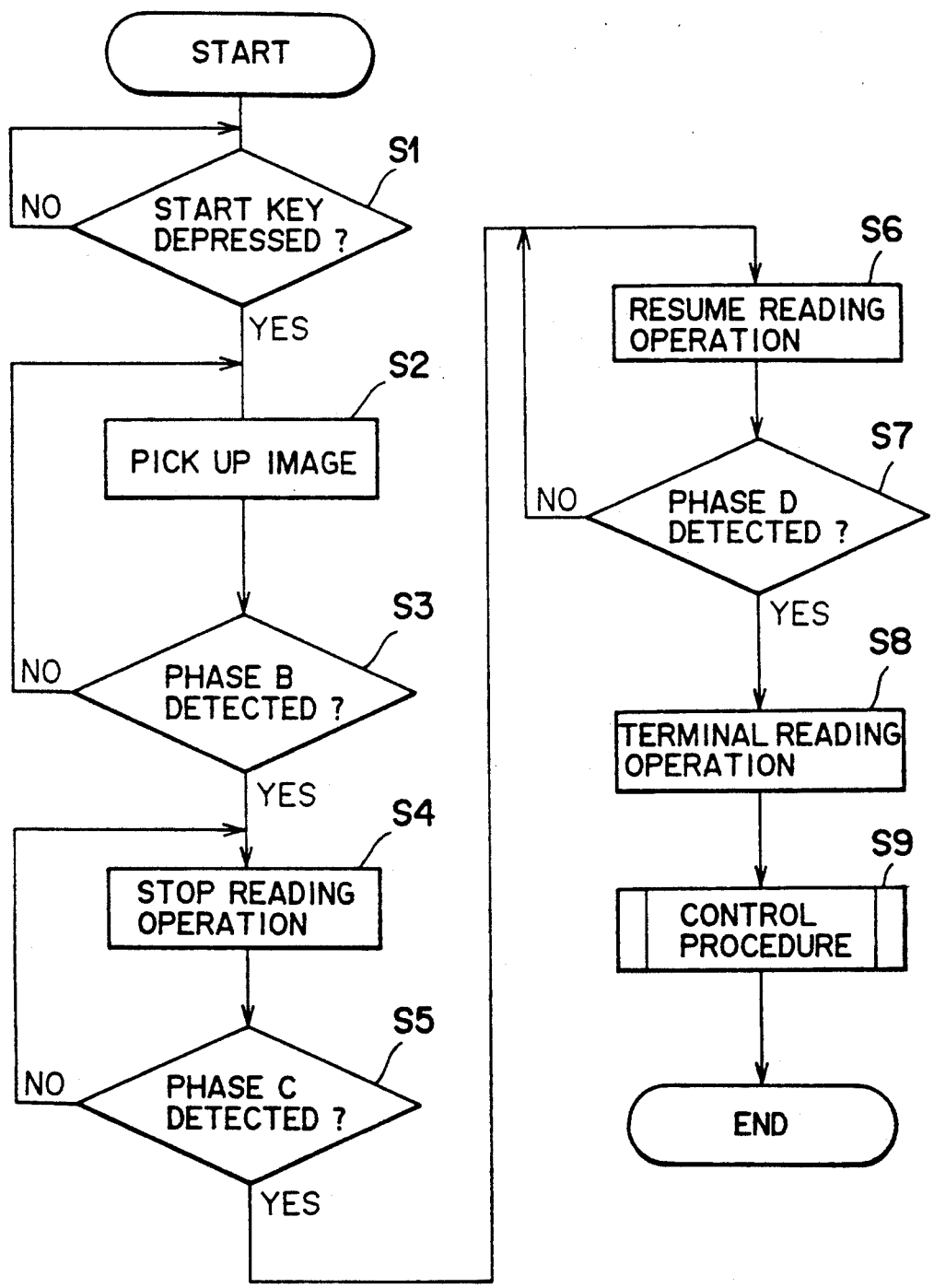
FIG. 5 is a block diagram showing a filter circuit according to a second embodiment of the invention.
Figure 6:
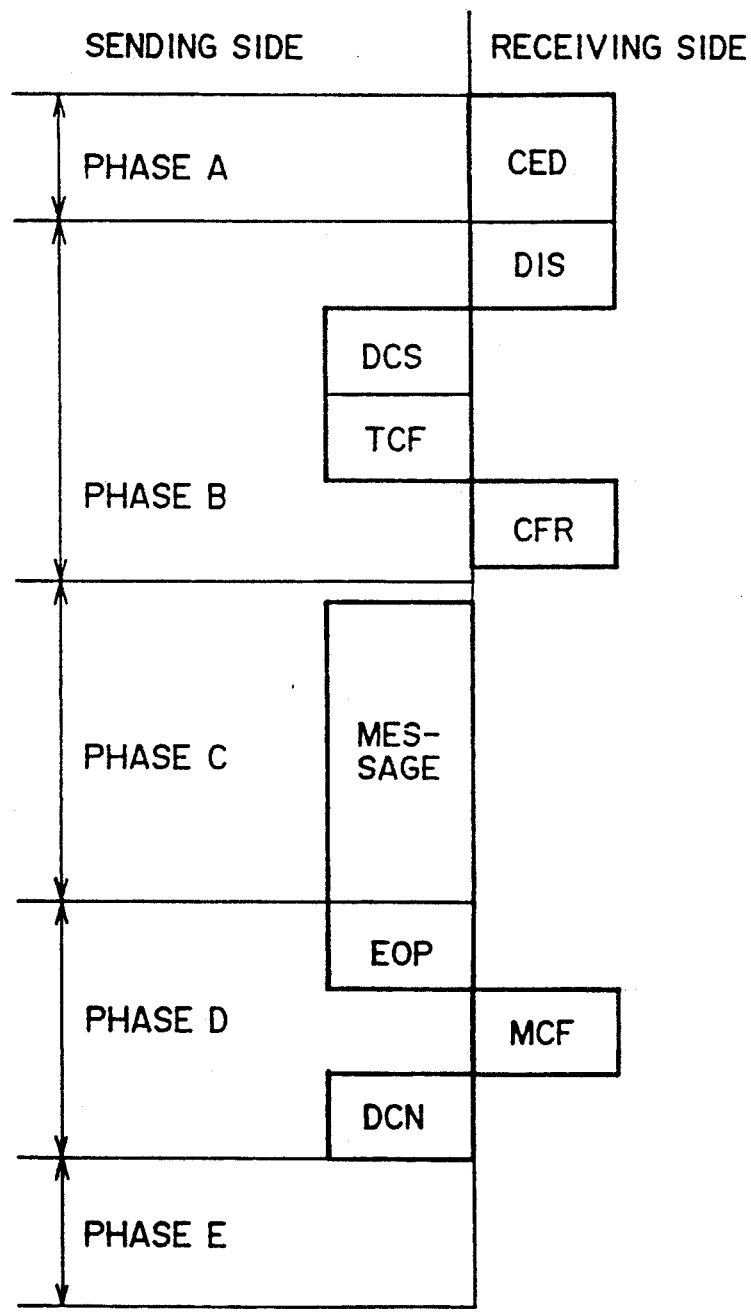
FIG. 6 is a block diagram showing an example of a multiplier used in the filter in FIG. 5.

FIG. 5 shows a second embodiment of the present invention. A filter circuit shown in FIG. 5 comprises two filter circuit units 621 and 622 for upper bits and lower bits of a digital video signal being composed of 8 bits, and an adder with weighting function 43 which weights outputs of the filter circuit unit 621 for upper procedure) signal in the case of GIII procedure. When phase D is not detected in step 7, the processing in step 6 is continuously carried out whereas when phase D is detected, the reading operation is terminated (step 7). In response to the phase D indicative signal, the CPU 40 determines the processing to follow (step 8). Specifically, in the case of an EOM signal, the routine returns to step 3. In the case of a MPS signal, the routine returns to step 5, and in the case of an EOP signal, the routine advances to phase E.

In the reading sequence described above, steps 1, 2 and 3 constitute advanced reading means, steps 4 and 5 constitute reading stopping means, and steps 6, 7 constitute reading resuming means.

As described, the CPU 40 instructs reading of the document in phases A and C. Reading of the document is not performed in phase B in which a number of signal exchanges between sending and receiving facsimiles are performed, whereby the working load imposed to the CPU 40 is dispersed.

In accordance with the present invention, the duration of phase B is shortened and, thus a higher speed facsimile transmission can be accomplished in comparison with the case where the reading of the document is performed in phase B.

What is claimed is:

1. A facsimile machine, comprising:
  reading means for reading an image on a document and outputting image data;
  storage means for storing the image data, the image data stored therein being retrieved therefrom and modulated for transmission to another facsimile machine via a communication line;
  advanced reading means for issuing an instruction to said reading means to start reading the image on the document and to store the image data in said storage means during a period of time from booting of the facsimile machine until establishment of communication to said another facsimile machine;
  reading stopping means for issuing an instruction to said reading means to stop reading the image on the document during a period of time from the establishment of communication to said another facsimile machine until a time when the transmission of the image data stored in said storage means to said another facsimile machine begins, said reading stopping means issuing said instruction to said reading means independent of a storage capacity of said facsimile machine; and
  reading resuming means for issuing an instruction to said reading means to resume reading the image on the document when the transmission of the image data stored in said storage means to said another facsimile machine begins, wherein transmission of the image data to said another facsimile machine is performed pursuant to a predetermined transmission sequence comprising a call establishing procedure phase, a beginning-of-message procedure phase, a message procedure phase, an end-of-message procedure phase and a calling retrieval procedure phase, and wherein the reading of the image on the document and the storing of the image data in said storage means are performed during said call establishing procedure and said message procedure phases.

2. A method of reading an image on a document with a scanner device incorporated in a facsimile machine wherein transmission of image data produced from the scanner device is transmitted pursuant to a predetermined transmission sequence comprising a call establishing procedure phase, a beginning-of-message procedure phase, a message procedure phase, an end-of-message procedure phase and a calling retrieval procedure phase, the method comprising the steps of:
  checking whether a start switch provided in the facsimile machine is depressed for transmission of the image data to another facsimile machine;
  performing a reading operation of the image on the document if the start switch is depressed;
  checking whether said beginning-of-message procedure phase is detected;
  stopping the reading operation if said beginning-of-message procedure phase is detected independent of a storage capacity of said facsimile machine;
  checking whether said message procedure phase is detected;
  resuming the reading operation if said message procedure phase is detected;
  checking whether said end-of-message procedure phase is detected; and
  stopping the reading operation if said end-of-message procedure phase is detected.

* * * * *